United States Patent
Spence et al.

(10) Patent No.: US 10,418,200 B2
(45) Date of Patent: Sep. 17, 2019

(54) CONTROLLING AN ELECTRICAL APPARATUS

(71) Applicant: Cooper Technologies Company, Houston, TX (US)

(72) Inventors: Glen Connor Spence, New Berlin, WI (US); Daniel Rian Kletti, Oak Creek, WI (US); Gavin Ray Kinsley, Racine, WI (US)

(73) Assignee: Eaton Intelligent Power Limited, Dublin (IE)

(*) Notice: Subject to any disclaimer, the term of this patent is extended or adjusted under 35 U.S.C. 154(b) by 275 days.

(21) Appl. No.: 15/466,429

(22) Filed: Mar. 22, 2017

(65) Prior Publication Data

US 2017/0294275 A1 Oct. 12, 2017

Related U.S. Application Data

(60) Provisional application No. 62/321,556, filed on Apr. 12, 2016.

(51) Int. Cl.
*H01H 9/54* (2006.01)
*H02H 7/26* (2006.01)
(Continued)

(52) U.S. Cl.
CPC .............. *H01H 9/54* (2013.01); *H02H 3/006* (2013.01); *H02H 7/26* (2013.01); *H04B 3/54* (2013.01)

(58) Field of Classification Search
CPC . H01H 9/54; H02H 3/006; H02H 7/26; H04B 3/54
(Continued)

(56) References Cited

U.S. PATENT DOCUMENTS 7,133,271 B2  11/2006  Jonas et al.
7,403,130 B2  7/2008  Brucker
(Continued)

FOREIGN PATENT DOCUMENTS

WO  2015019184 A2  2/2015

OTHER PUBLICATIONS

"Nova(TM) three-phase, microprocessor-controlled recloser," Cooper Power Series, Reclosers Catalog Data CA280003EN, Mar. 2015, 12 pages.
(Continued)

*Primary Examiner* — Kevin J Comber
(74) *Attorney, Agent, or Firm* — DiBerardino McGovern SP Group LLC

(57) ABSTRACT

An electrical apparatus of an electrical power distribution network may be controlled by accessing, at a control system, one or more operating parameters, the operating parameters being associated with the operation and control of the electrical apparatus; adjusting one or more of the accessed operating parameters, the adjustment being based on data associated with the electrical apparatus; and generating a control signal for the electrical apparatus based on at least one adjusted parameter, the control signal being sufficient to control the electrical apparatus in accordance with the adjusted operating parameter, where controlling the electrical apparatus includes causing contacts of the electrical apparatus to disconnect from each other to prevent electrical current from flowing through the electrical apparatus and causing the contacts of the electrical apparatus to connect to each other to allow current to flow through the electrical apparatus.

21 Claims, 8 Drawing Sheets

(51) Int. Cl.
  *H04B 3/54* (2006.01)
  *H02H 3/00* (2006.01)
(58) Field of Classification Search
  USPC .......................................................... 361/211
  See application file for complete search history.

(56) References Cited

U.S. PATENT DOCUMENTS

| | | | |
|---|---|---|---|
| 7,495,574 | B2 | 2/2009 | Rocamora et al. |
| 7,541,756 | B1 | 2/2009 | Parent et al. |
| 9,281,689 | B2 | 3/2016 | Boardman et al. |
| 2006/0039094 | A1* | 2/2006 | Brucker .................. H02H 1/06 361/71 |
| 2011/0062939 | A1 | 3/2011 | Hoover |
| 2011/0313586 | A1 | 12/2011 | Popescu et al. |
| 2012/0072043 | A1 | 3/2012 | Arzig |
| 2016/0225562 | A1* | 8/2016 | Franks .................. H02H 3/006 |
| 2018/0059186 | A1* | 3/2018 | Yang .................. G01R 31/3274 |

OTHER PUBLICATIONS

"Types W, WV27, WV38X, VW, VWV27, and VWV38X, three-phase hydraulically controlled reclosers," Cooper Power Series, Reclosers Catalog Data CA280005EN, Jan. 2016, 24 pages.

"Types VSA12, VSA12B, VSA16, VSA20, and VSA20A; three-phase; air-insuated; electronically controlled recloser," Cooper Power Series, Reclosers Catalog Data CA280008EN, Jan. 2016, 12 pages.

"Versa-Tech(R) I Versa-Tech(R) LT Recloser," Catalog 10E, Oct. 2015, Hubbell Power Systems, 12 pages.

"S&C's IntelliRupter(R) PulseCloser eliminates the need to close into a fault to test the line," S&C Electric Company, 2009, 1 page.

International Search Report and Written Opinion, counterpart PCT Application No. PCT/US2017/023619, dated Jun. 30, 2017, 10 pages total.

* cited by examiner

CONTROLLING AN ELECTRICAL APPARATUS

CROSS-REFERENCE TO RELATED APPLICATION

This application claims the benefit of U.S. Provisional Application No. 62/321,556, filed on Apr. 12, 2016 and titled CONTROLLING AN ELECTRICAL APPARATUS, which is incorporated herein by reference in its entirety.

TECHNICAL FIELD

This disclosure relates to a controlling an electrical apparatus, such as a recloser or a switchgear.

BACKGROUND

Switchgears or reclosers may be used in an electrical power distribution network to protect the network from electrical fault conditions, which may produce high current or voltage transients. Under normal operating conditions, the recloser is closed, and electrical current flows through the recloser. In response to detecting a fault condition, the recloser trips or opens to prevent current from flowing through the recloser, and then opens and closes a number of times. If the fault condition persists, the recloser remains open. If the fault condition clears, the recloser closes and the distribution network resumes normal operation.

SUMMARY

In one general aspect, a system includes: an electrical apparatus configured to control the flow of electricity in a power distribution network, the electrical apparatus including: a communications interface and electrical contacts, the electrical contacts configured to connect to each other to allow electricity to flow through the electrical apparatus and to disconnect from each other to prevent electricity from flowing through the electrical apparatus; and a control system for the electrical apparatus, the control system including: a data connection configured to connect to the communications interface of an electrical apparatus and to receive electrical data from the electrical apparatus; an identification module configured to produce an electrical measurement based on electrical data received from the electrical apparatus through the data connection; and an electronic storage and one or more electronic processors coupled to the electronic storage, the electronic storage including instructions that, when executed, cause the one or more electronic processors to: identify the electrical apparatus based on the electrical measurement, and adjust one or more operating parameters of the electrical apparatus based on the identity of the electrical apparatus.

Implementations may include one or more of the following features. The electrical apparatus may include one or more electrical or mechanical components, the one or more electrical or mechanical components being associated with an electrical characteristic and at least some of the electrical data from the electrical apparatus depends on the electrical characteristic, and the identification module may be configured to produce an electrical measurement that depends on the electrical characteristic. The identification module may include a network of electrical components configured to produce a voltage based on the electrical data from the electrical apparatus, and the electrical apparatus may be identified based on the voltage. The identification module may include a network of electrical components configured to produce a current based on the electrical data from the electrical apparatus, and the electrical apparatus may be identified based on the current. The identification module may include a network of electrical components, the network of electrical components may include at least one transistor.

In some implementations, identifying the electrical apparatus includes identifying the electrical apparatus as a type of electrical apparatus. Identifying the electrical apparatus may include identifying the electrical apparatus as a particular electrical apparatus.

The one or more operating parameters of the electrical apparatus that are adjusted based on the identity of the electrical apparatus may include one or more of: a reclose interval, the reclose interval being a time during which the contacts of the electrical apparatus are disconnected during a fault condition in the power distribution network, a time current curve (TCC), the TCC being a time duration during which the contacts of the electrical apparatus are connected during a fault condition, a temporal duration of a trip pulse, the contacts of the electrical apparatus being configured to disconnect from each other in response to the trip pulse, and a temporal duration of a close pulse duration, the contacts of the electrical apparatus being configured to connect to each other in response to the close pulse. The electrical data received from the electrical apparatus may include information indicating one or more of a time for the contacts of the electrical apparatus to open and a time for the contacts to close, and one or more of the operating parameters are adjusted based on the information indicating the time for the contacts to open or the time for the contacts to close.

The electrical data received from the electrical apparatus may include information indicating one or more of a time for the contacts of the electrical apparatus to open and a time for the contacts to close, and one or more of the operating parameters may be adjusted based on the information indicating the time for the contacts to open or the time for the contacts to close.

The system also may include a temperature sensor positioned to measure a temperature at the electrical apparatus, the temperature sensor being configured to provide the measured temperature to the control system. The one or more operating parameters of the electrical apparatus may be adjusted based on the identity of the electrical apparatus and the measured temperature at the electrical apparatus.

The instructions to adjust one or more operating parameters of the electrical apparatus may include instructions to cause one or more of the operating parameters to be updated to a respective default setting. Adjusting one or more of the operating parameters of the electrical apparatus may include adjusting at least one of the operating parameters based on an accessed template associated with the electrical apparatus, and the electronic storage of the control system may further include instructions that, when executed, cause the one or more processors to: access the template associated with the electrical apparatus, the template including settings for one or more of the operating parameters of the electrical apparatus; compare the settings for the one or more of the operating parameters in the template to the default setting for the respective parameter; determine whether the settings of the operating parameters in the template are acceptable based on the comparison; and replace any operating parameters in the template that are not acceptable with the default setting for that parameter. The template associated with the electrical apparatus may be configured to be edited by an operator.

The electronic storage of the control system also may include instructions that, when executed, cause the one or more processors to present an indication that one or more operating parameters have been adjusted, the indication being perceivable to an operator of the system.

In some implementations, the system also includes a backup source of electrical power, and the one or more operating parameters of the electrical apparatus may be adjusted based on the identity of the electrical apparatus and the presence of the backup source of electrical power.

The electronic storage of the control system may include instructions that, when executed, cause the one or more processors to estimate an operating lifetime of the electrical apparatus, and the one or more operating parameters of the electrical apparatus may be adjusted based on the identity of the electrical apparatus and the estimated operating lifetime of the electrical apparatus.

In another general aspect, a method of controlling an electrical apparatus of an electrical power distribution network includes: accessing, at a control system, one or more operating parameters, the operating parameters being associated with the operation and control of the electrical apparatus; adjusting one or more of the accessed operating parameters, the adjustment being based on data associated with the electrical apparatus; and generating a control signal for the electrical apparatus based on at least one adjusted parameter, the control signal being sufficient to control the electrical apparatus in accordance with the adjusted operating parameter, where controlling the electrical apparatus includes causing contacts of the electrical apparatus to disconnect from each other to prevent electrical current from flowing through the electrical apparatus and causing the contacts of the electrical apparatus to connect to each other to allow current to flow through the electrical apparatus.

Implementations may include one or more of the following features. The electrical apparatus may be identified, at the control system, based on the data associated with the electrical apparatus. An identification module may be activated at the control system, and the data associated with the electrical apparatus may be received from the electrical apparatus, the identification module may produce an electrical measurement based on the data received from the electrical apparatus, and the electrical apparatus may be identified based on the electrical measurement. The data associated with the electrical apparatus may be received from an input interface at the control system. The data associated with the electrical apparatus and received from an input interface may include user-defined settings for at least one of the accessed operating parameters, and the user-defined settings may be compared to default settings for the at least one of the accessed operating parameters, whether the user-defined settings are acceptable may be determined based on the comparison, and the user-defined settings may be replaced with the default settings if the user-defined settings are not acceptable.

In some implementations, the data associated with the electrical apparatus includes an electrical signal from the electrical apparatus, and identifying the electrical apparatus includes: measuring a voltage, the measured voltage being based on the electrical signal from the electrical apparatus, comparing the measured voltage to one or more threshold voltages, and identifying the electrical apparatus based on the comparison.

The data associated with the electrical apparatus may include data indicating a condition associated with the electrical apparatus, and one or more operating parameters may be adjusted based on the condition, and the condition associated with the electrical apparatus may include one or more of a temperature at the electrical apparatus, an expected remaining lifetime of the electrical apparatus, and a status of an energy storage device at the control system.

The data associated with the electrical apparatus may include data received from the electrical apparatus, and may include information indicating one or more of a time for contacts of an interrupting module of the electrical apparatus to disconnect and a time for the contacts of the interrupting module of the electrical apparatus to reconnect.

In another general aspect, a control system for an electrical apparatus of an electrical power distribution network includes: a data connection configured to connect to a communications interface of an electrical apparatus, the data connection being configured to send information to and receive information from the electrical apparatus, the electrical apparatus being configured to control whether electricity flows between a first portion of the power distribution network and a second portion of the power distribution network; and an electronic storage and one or more electronic processors coupled to the electronic storage, the electronic storage including a template of settings for one or more operating parameters of the electrical apparatus, and the electronic storage including instructions that, when executed, cause the one or more electronic processors to: access data associated with the electrical apparatus; identify the electrical apparatus based on accessed data; and determine whether to adjust one or more of the operating parameters of the template based on the identity of the electrical apparatus.

Implementations may include one or more of the following features. The accessed data associated with the electrical apparatus may be based on data received from the electrical apparatus through the data connection. The control system also may include an identification module configured to produce an electrical measurement based on the data received from the electrical apparatus through the data connection, and the electrical apparatus may be identified based on the electrical measurement. The control system may include an input interface configured for manipulation by an operator of the control system, and the accessed data associated with the electrical apparatus may be based on data received from the input interface of the control system, and the electrical apparatus may be identified based on the data received from the input interface of the control system.

The data connection may include a wireless data connection. The data connection may be a single control cable.

In another general aspect, an electrical apparatus includes an interrupting module including contacts, the interrupting module being configured to control the flow of electricity in a transmission path of an electrical power distribution network by connecting and disconnecting the contacts; an environmental sensor positioned to measure an environmental condition external to the electrical apparatus; and a control module coupled to interrupting module and the environmental sensor through a data connection, the control module being configured to receive data from the environmental sensor and to provide a control signal to the interrupting module to cause the contacts of the interrupting module to disconnect in response to detecting a fault condition and to connect after a reclose interval, the reclose interval being defined by one of a plurality of operating parameters associated with the electrical apparatus, and the control module is configured to compare the data received from the environmental sensor to a threshold to determine whether to adjust any of the operating parameters.

Implementations of any of the techniques described herein may include an apparatus, a control system, a system that includes a control system and an electrical apparatus, an electrical apparatus, a device for protecting an electrical power distribution network, a kit for retrofitting a control system, a recloser or switchgear with an integrated control system, instructions stored on a non-transient machine-readable computer medium, and/or a method. The details of one or more implementations are set forth in the accompanying drawings and the description below. Other features will be apparent from the description and drawings, and from the claims.

DRAWING DESCRIPTION

DETAILED DESCRIPTION

Figure 1:
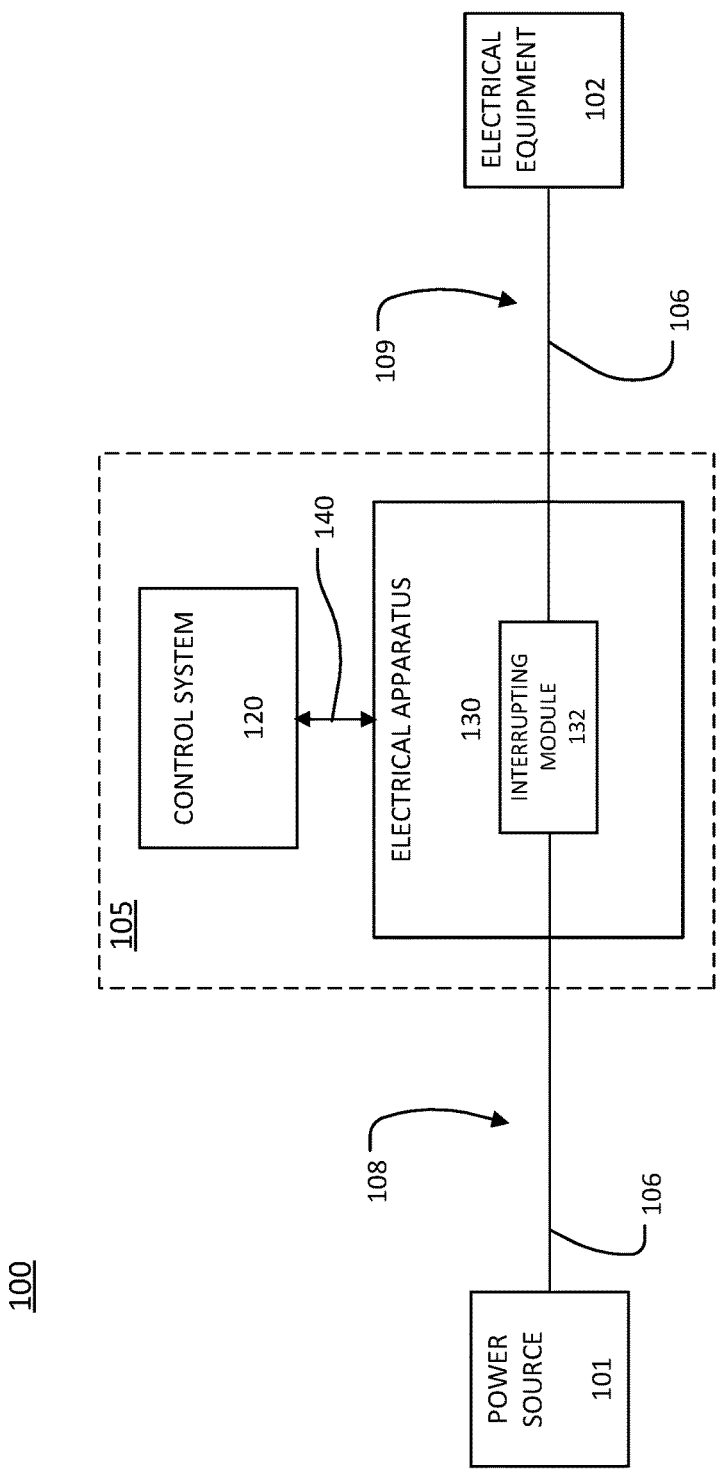
FIG. 1 is a block diagram of an example of electrical power distribution network.

Referring to FIG. 1, a block diagram of an example electrical power distribution network 100, which includes electrical apparatus 130, is shown. The electrical apparatus 130 may be, for example, a switchgear, a single-phase recloser, a triple single-phase recloser, or a three-phase recloser. Techniques for adjusting the operating parameters of the electrical apparatus 130 are disclosed. The operating parameters may be adjusted during operation of the electrical apparatus 130 and may be adjusted based on the identity of the electrical apparatus 130 and/or the conditions under which the electrical apparatus 130 operates.

The electrical power distribution network 100 may be any network that transfers electricity from a power source 101 to electrical equipment 102. The electrical power distribution network 100 may be, for example, an electrical grid, and electrical system, or a multi-phase electrical network that provides electricity to commercial and/or residential customers. The power distribution network 100 may have an operating voltage of, for example, at least 1 kilovolt (kV), up to 34.5 kV, up to 38 kV, or 69 kV or higher. The power distribution network 100 may operate at a fundamental frequency of, for example, 50-60 Hertz (Hz).

The power source 101 may be any source of electrical power. The electrical equipment 102 may be any electrical equipment that receives electricity from the power source 101 and may include electrical equipment that receives and transfers or distributes electricity to other equipment in the power distribution network 100. For example, the electrical equipment 102 may include transformers, fuses, electrical machinery in a manufacturing facility, and/or electrical appliances and devices in a residential building.

The power distribution network 100 transports electricity from a first portion 108 of the network 100 to a second portion 109 of the network via a transmission path 106. The transmission path 106 may include, for example, one or more transmission lines, electrical cables, and/or any other mechanism for transmitting electricity. The flow of electricity between the first portion 108 and the second portion 109 is controlled by a system 105, which includes a control system 120 that communicates with the electrical apparatus 130 through a data connection 140.

The electrical apparatus 130 includes an interrupting module 132, which is capable of interrupting (opening) and closing the transmission path 106. When the transmission path 106 is open, current does not flow between the portions 108 and 109. When the transmission path 106 is closed, current flows between the portions 108 and 109. The interrupting module 132 may include electrically conductive contacts that connect to close the transmission path 106, allowing electrical current to flow through the electrical apparatus 130, and disconnect to open the transmission path 106.

Under normal operating conditions, the interrupting module 132 is closed, and electricity flows between the first portion 108 and the second portion 109. When a fault condition occurs, the interrupting module 132 opens the transmission path 106 such that electrical current does not flow through the electrical apparatus 130. After a brief amount of time, the interrupting module 132 closes the transmission path 106. If the fault condition persists, the interrupting module 132 opens the transmission path 106 again, but otherwise the interrupting module 132 recloses such that electricity flows through the electrical apparatus 130 and the transmission path 106. In other words, if the fault is persistent, the electrical apparatus 130 isolates the fault from the remaining portions of the electrical power distribution network 100 by keeping the transmission path 106 open, but, if the fault is temporary, the electrical apparatus 130 reenergizes the transmission path 106 to restore service to the electrical equipment 102.

The control system 120 controls the operation of the interrupting module 132 through the data connection 140, and thus the control system 120 also controls the flow of electricity from the first portion 108 to the second portion 109. The control of the electrical apparatus 130 and the interrupting module 132 is at least partially governed by one or more operating parameters. The interrupting module 132 is capable of opening and closing the transmission path 106 in response to a signal from the control system 120, and the operating parameters determine the manner in which the interrupting module 132 opens and closes the transmission path 106. In other words, the operating parameters allow more precise control of the interrupting module 132 and add functionality to the basic opening and closing action. By adjusting the operating parameters, the operation of the interrupting module 132 may be tailored to the electrical apparatus 130 and/or the conditions under which it operates.

The operating parameters may include, for example, a reclose interval, which is a time during which the interrupting module 132 is opened during a fault condition, and a time current curve (TCC), which is a time during which the interrupting module 132 is closed during a fault condition. When a fault is detected, the interrupting module 132 may be opened and closed a pre-determined number of times. In a situation in which the fault is not cleared after the first opening and closing, the first reclose interval may be shorter than subsequent reclose intervals to provide more time for the fault to clear. Thus, the TCC and the reclose interval may have a range of times that fully describe the opening and closing of the interrupting module 132 in response to detecting a fault condition. The interrupting module 132 may open in response to receiving a trip pulse from the control system 120, and the interrupting module 132 may close in response to receiving a close pulse from the control system 120. The operating parameters associated with the electrical apparatus 130 may include a temporal duration of the trip pulse and a temporal duration of the close pulse.

The ideal or optimal settings of the operating parameters may depend on the internal configuration of the electrical apparatus 130 and/or the environmental conditions under which the electrical apparatus 130 is operating. The internal configuration may vary among types of electrical apparatus or may be unique to a particular apparatus. Additionally, the ideal or optimal settings of the operating parameters may be impacted by characteristics of the system 105, such as the amount of life remaining on the electrical apparatus 130 and whether a backup source of power is present in the system 105.

The control system 120 is capable of adjusting all or some of the operating parameters while the electrical apparatus 130 is installed in the electrical power distribution network 100 and/or while the electrical apparatus 130 is in use. The control system 105 may identify the electrical apparatus 130 as a certain type of electrical apparatus or as a unique electrical apparatus and may adjust one or more of the operating parameters based on the identity of the electrical apparatus 130. Additionally or alternatively, the control system 120 may receive data from the electrical apparatus 130 and/or other sensors that inform the control system 120 of the conditions under which the electrical apparatus 130 is operating, and the control system 120 may adjust one or more of the operating parameters based on the conditions.

The control system 120 also may adjust the operating parameters based on data received from the electrical apparatus 130, with or without identifying the electrical apparatus 130 or the conditions under which the electrical apparatus 130 operates. For example, the electrical apparatus 130 may provide data indicating how long the electrical apparatus 130 takes to open the transmission path 106 after receiving a trip pulse, and the control system 120 may adjust the reclose interval (the time during which the electrical apparatus 130 is open) and/or the TCC (the time during which the electrical apparatus 130 is closed) based on the actual time required to open the transmission path 106.

Further, the control system 120 provides safeguards against incorrect end-user changes to the operating parameters and incorrect automatic updates. For example, the control system 120 may determine that operating parameter settings provided by an end-user of the system 105 are unsuitable for the electrical apparatus 130 and/or the conditions under which the electrical apparatus 130 is operating. In these situations, the control system 120 may replace the settings provided by the end-user with default settings under which the electrical apparatus 130 is known or expected to perform optimally.

By adjusting the operating parameters to suit the electrical apparatus 130 and/or the conditions, the control system 120 offers improved and more predictable performance and greater reliability than a control system that controls the electrical apparatus without regard to the identity and/or operating conditions of the electrical apparatus. Additionally, because the operation of the entire network 100 is impacted by the performance of the system 105, improving the performance of the system 105 also may improve the performance and reliability of the network 100.

Figure 2:
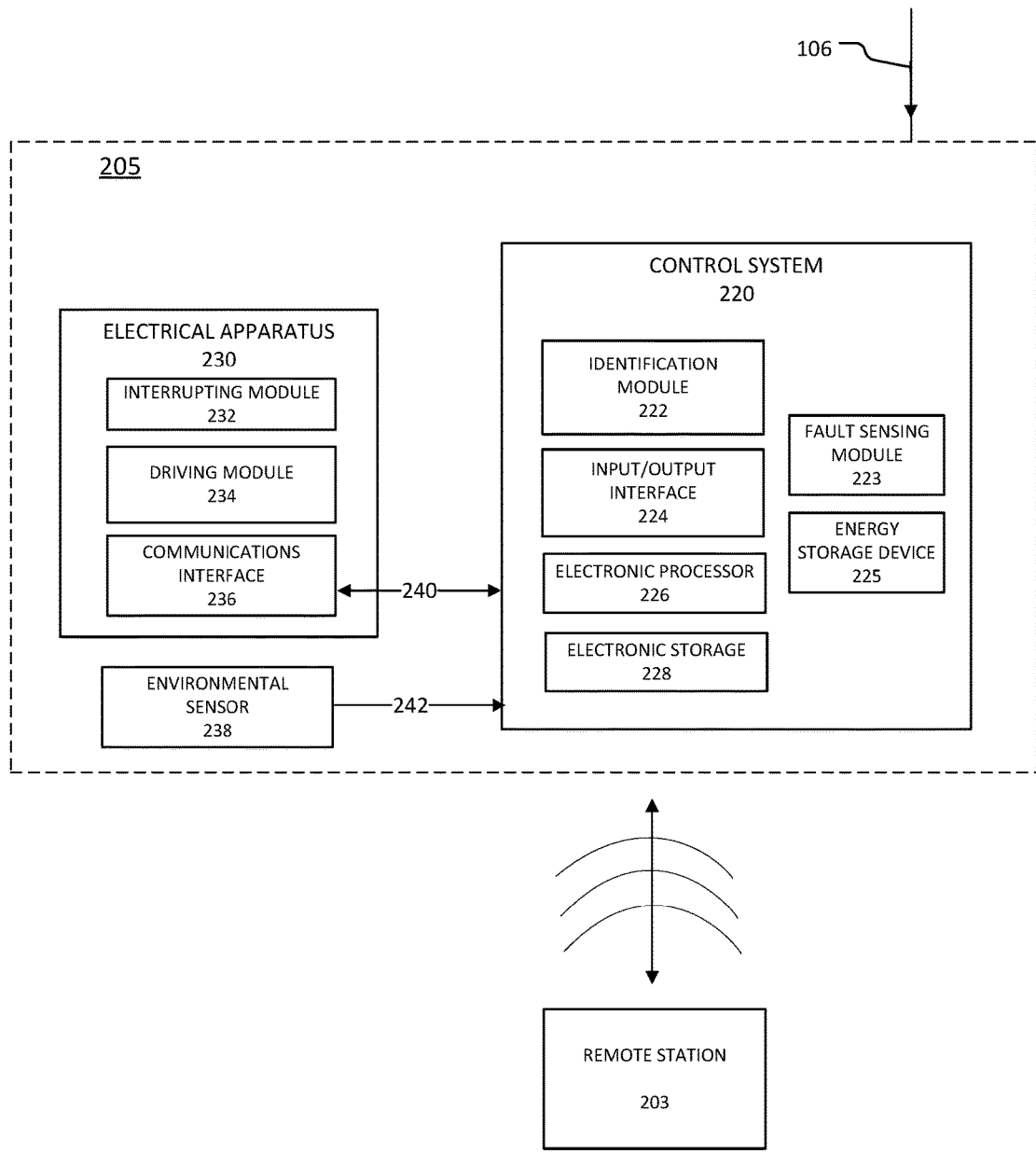
FIG. 2 is a block diagram of an example of a system for controlling electricity in an electrical power distribution network.

Referring to FIG. 2, a block diagram of an example system 205 is shown. The system 205 is used to control the flow of electricity between portions of an electrical power distribution network. For example, the system 205 may be used in the power distribution network 100 (FIG. 1) as the system 105.

The system 205 includes a control system 220, which sends data to and receives data from an electrical apparatus 230 via a data connection 240. The electrical apparatus 230 includes an interrupting module 232, a driving module 234, and a communications interface 236. The electrical apparatus 230 may be any type of apparatus that is capable of being controlled to open and close a transmission path in a power distribution system. For example, the electrical apparatus 230 may be a switchgear, a single-phase recloser, a triple single-phase recloser, or a three-phase recloser.

The system 205 also may include an environmental sensor 238. The environmental sensor 238 may be any sensor that measures a characteristic of the environment in which the electrical apparatus 230 operates. For example, the environmental sensor may measure temperature or other weather conditions outside of the electrical apparatus 230. The environmental sensor 238 is positioned at or near the electrical apparatus 230, and may be positioned on the electrical apparatus 230. In some implementations, the environmental sensor 238 is integrated with the control system 220 or the electrical apparatus 230. In other implementations, the environmental sensor 238 is physically separate from the control system 220 and the electrical apparatus 230. Regardless, the environmental sensor 238 communicates information about the environment to the control system 220. The environmental sensor 238 may communicate data to the control system 220 through a link 242. In implementations in which the environmental sensor 238 is included in the electrical apparatus 230, the information about the environment may be communicated to the control system 220 via the data connection 240 instead of or in addition to the link 242.

The link 242 and the data connection 240 may be any communication link capable of transmitting information. The link 242 and/or the data connection 240 may be bi-directional and may send information to and receive information from the control system 220. The link 242 and the data connection 240 may be wireless, wired, or a combination of wireless and wired. In some implementations, the data connection 240 is a single control cable connected between the communications interface 236 of the electrical apparatus and the control system 220. The communications interface 236 may be any interface capable of sending data to and receiving data from an input/output interface 224 of the control system 220 via the connection 240. The communications interface 236 may connect to a physical cable or may be an interface that allows wireless communications.

The electrical apparatus 230 also includes the interrupting module 232 and the driving module 234, which drives the interrupting module 232 in response to a control signal received from the control system 220 via the data connection 240. The electrical apparatus 230 includes an interrupting module 232 for each phase. Thus, a three-phase apparatus includes three interrupting modules 232.

The interrupting module 232 is any mechanism or device that is capable of repeatedly interrupting and reclosing a transmission path (such as a transmission line) in an electrical power distribution network. For example, the interrupting module 232 may be a vacuum interrupter. The interrupting module 232 may include electrically conductive contacts that electrically couple to the transmission path 106. When the contacts are connected, electricity flows through the electrical apparatus 230. When the contacts are disconnected, electricity is prevented from flowing through the electrical apparatus 230. The contacts of the interrupting module 232 may be in a vacuum or a dielectric medium (such as, for example, oil, foam, gas, or a mixture of such media) that quenches an arc that may form when the contacts disconnect. The interrupting module 232 also may include sensing current transformers for sensing the amount of current that flows in each phase in the transmission path 106 and/or sensors that monitor the position of the contacts of the interrupting module 232. The amount of current sensed by the current transformers is provided to the control system 120 via the data connection 140. The position sensors provide position data to the control system 120 via the data connection 140, and the control system 120 may use the position data to determine, for example, the time required to open and close the contacts.

The driving module 234 may include passive and/or active electrical and/or mechanical components that drive the interrupting module 232 to open or close in response to a control signal from the control system 220. For example, in some implementations, the driving module 234 may include capacitors that provide energy to the interrupting module 232 for closing or opening the contacts. In some implementations, the driving module 234 includes magnets. The driving module 234 may include resistors, inductors, and other passive electronic components. In some implementations, the driving module 234 includes devices that store mechanical energy, such as springs. In some implementations, the driving module 234 includes a motor.

The components of the driving module 234 have an electrical characteristic that varies depending on the specific components and their arrangement relative to each other. For example, the components of the driving module 234 may have a collective impedance that depends on the nature and arrangement of the individual parts that make up the driving module 234. Because the specific components vary among different types of electrical apparatuses, the electrical characteristic of the components of the driving module 234 may vary among different types of electrical apparatuses.

A manufacturer may produce many types of electrical apparatuses, and an existing electrical power distribution network may have many of the types of electrical apparatus already in service. The specific configuration of the interrupting module 232 and the driving module 234 may vary among the types of electrical apparatuses. Additionally, within a particular type of electrical apparatus, individual electrical apparatuses may differ from a nominal electrical apparatus of that type. However, the control system 220 is able to improve the operation of any of these various types of electrical apparatuses by adjusting the parameters of the electrical apparatus based on the identity of the electrical apparatus 230 and/or its operating conditions.

The system 205 also includes the control system 220. The control system 220 and the electrical apparatus 230 may be physically separated from each other. For example, the electrical apparatus 230 may be mounted near the top of a utility pole or other structure associated with overhead power lines, and the control system 220 may be mounted on the same pole or structure near the ground to facilitate operator access to the control system 220. In another example, the control system 220 may be located at a utility station that is remote from the electrical apparatus 130, with the data connection 240 being a wireless connection. In yet other implementations, the control system 220 is integrated with the electrical apparatus 230 such that the system 205 forms a single, self-contained device. In implementations in which the control system 220 is integrated with the electrical apparatus 230, the control system 220 and the electrical apparatus 230 communicate data via the data connection 240, but the control system 220 and the electrical apparatus 230 are part of the same device and may be received in, for example, a single integrated housing.

Figure 3A:
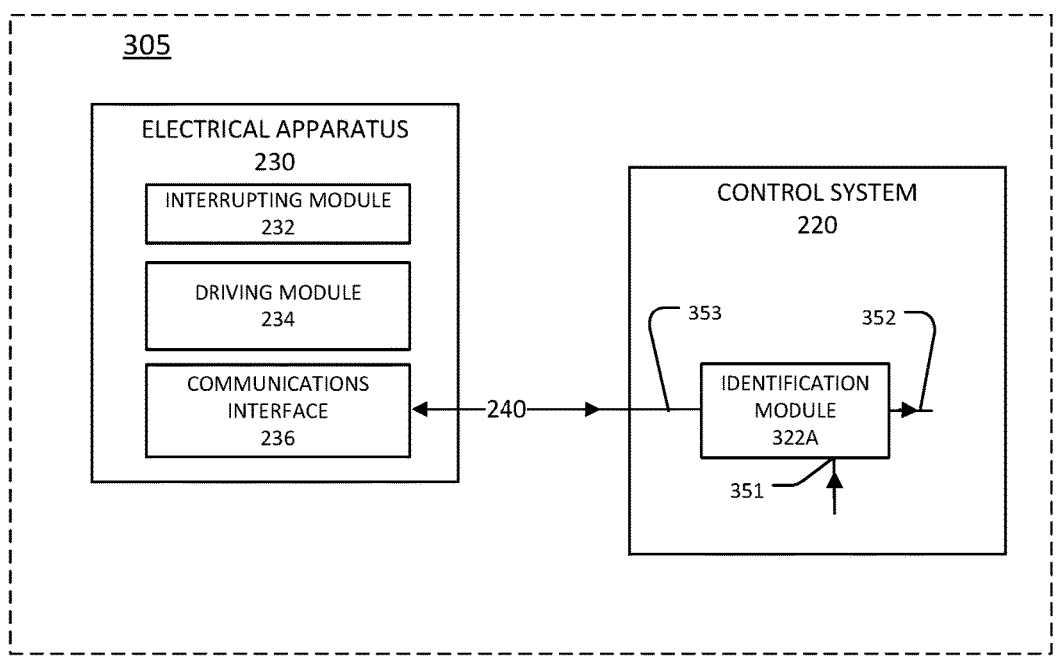
FIGS. 3A-3C are block diagrams of example identification modules.
Figure 3B:
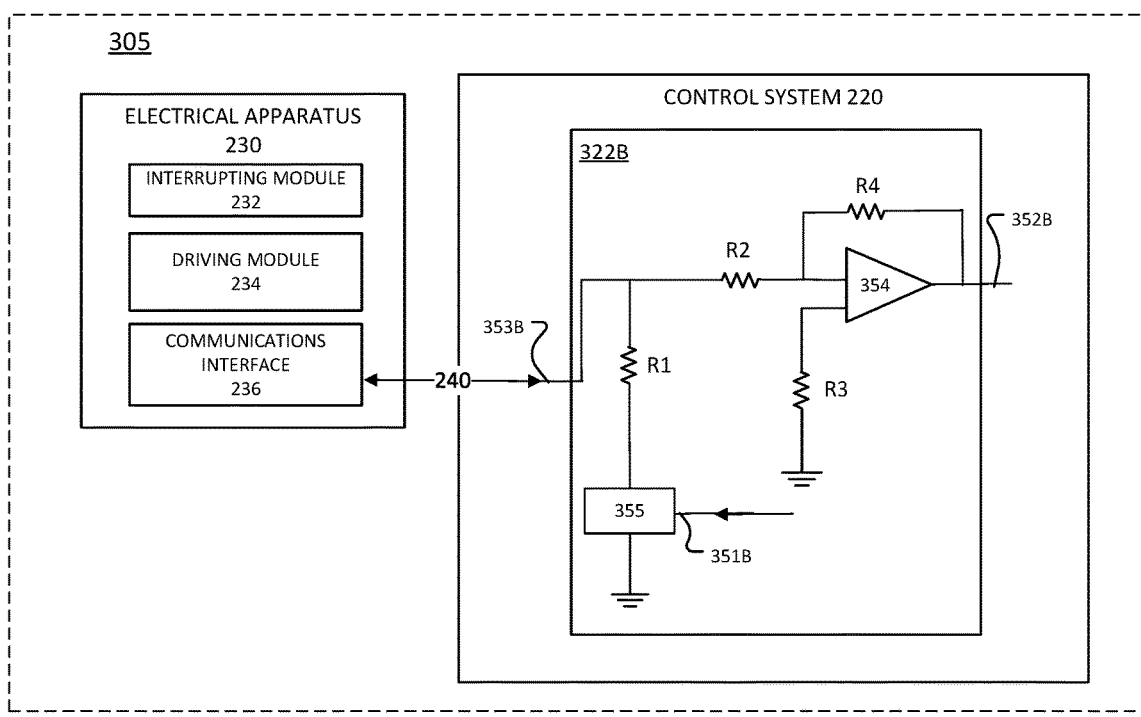
Figure 3C:
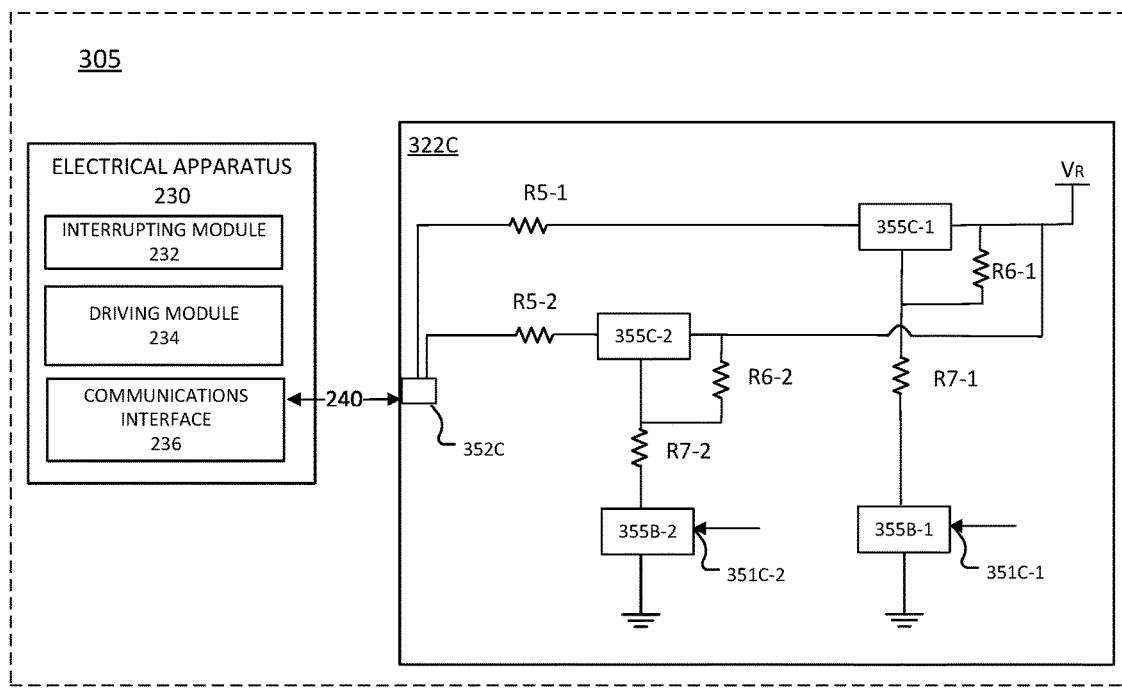

The control system 220 may include an identification module 222, a fault sensing module 223, an input/output (I/O) interface 224, an energy storage device 225, an electronic processor 226, and an electronic storage 228. The identification module 222 identifies the electrical apparatus 230. The identification module 222 may be a collection of active (such as transistors and operational amplifiers) and passive electronic components (such as resistors) that convert or modify a current or a voltage signal received from the electrical apparatus 230 into a current or voltage signal that has a magnitude indicative of the components included in the driving module 234 and/or the interrupting module 232 of the electrical apparatus 230. The identification module 222 may be activated by a test signal (for example, a voltage or a current) and produce a signal (for example, a voltage or current) in response. As discussed above, the interrupting module 232 and the driving module 234 may differ among the various types of electrical apparatuses. Thus, the voltage or current signal produced by the identification module 222 in response to the test signal may be used to identify the electrical apparatus 230 as a particular type of electrical apparatus or as an electrical apparatus that has certain characteristics. FIGS. 3A-3C provide examples of the identification module 222.

The control system 220 also includes a fault sensing module 223, which determines whether a fault condition is present. For example, the fault sensing module 223 may detect a fault based on the current measurements provided by the sensing current transformers in the interrupting module 232. The fault sensing module 223 may determine that a fault is present when the current exceeds a predetermined threshold level. When a fault is detected, the control system 220 issues a command or control signal to the electrical apparatus 230 to open the interrupting module 232.

The I/O interface 224 may be any interface that allows a human operator and/or an autonomous process to interact with the control system 220. The I/O interface 224 may include, for example, a display, a keyboard, speakers, a serial or parallel port, a Universal Serial Bus (USB) connection, and/or any type of network interface, such as, for example, Ethernet. The I/O interface 224 also may allow communication without physical contact through, for example, an IEEE 802.11, Bluetooth, or a near-field communication (NFC) connection. The control system 220 may be programmed by an operator or receive an update through the I/O interface 224. The I/O interface 224 may allow an operator to enter settings for operating parameters directly into the control system 220. In some implementations, an operator may enter the identity of the electrical apparatus 230 through the I/O interface 224. In these implementations, the operator manipulates the I/O interface 224 to enter data into the control system 220, and the I/O interface 224 may include a physical panel or a graphical user interface that is presented on a display. Additionally, the operator or an autonomous process may access information about the system 205, such as data from the electrical apparatus 230 or the environmental sensor 238, through the I/O interface 224. The I/O interface 224 also couples to the data connection 240 to send data to and receive data from the communications interface 236 of the electrical apparatus 230.

The I/O interface 224 also may allow the control system 220 to communicate with systems external to and remote from the system 205. For example, the I/O interface 224 may include a communications interface that allows communication between the control system 220 and a remote station 203, or between the control system 220 and an electrical apparatus other than the apparatus 230, through the I/O interface 224 using, for example, the Supervisory Control and Data Acquisition (SCADA) protocol or another services protocol, such as Secure Shell (SSH) or the Hypertext Transfer Protocol (HTTP).

Under normal operations, the control system 220 may receive power from the transmission path 106. However, the control system 220 also may include an energy storage device 225, which may power the control system 220 when electricity is not flowing in the transmission path 106. Thus, the energy storage device 225 allows the control system 220 to continue to operate during a fault condition when the transmission path 106 is open. Additionally, the energy storage device 225 may provide charge to storage elements (such as capacitors) in the driving module 234 of the electrical apparatus 230. The charge may be provided through the data connection 240 or through a separate connection. The energy storage device 225 may be any device that is capable of storing electrical charge and powering the control system 220. For example, the energy storage device 225 may be a battery.

The control system 220 also includes the electronic processor 226 and the electronic storage 228. The electronic processor 226 may be may be one or more processors suitable for the execution of a computer program such as a general or special purpose microprocessor, and any one or more processors of any kind of digital computer. Generally, a processor receives instructions and data from a read-only memory or a random access memory or both. The electronic processor 226 may be any type of electronic processor, may be more than one electronic processor, and may include a general purpose central processing unit (CPU), a graphics processing unit (GPU), a microcontroller, a field-programmable gate array (FPGA), and/or an application-specific integrated circuit (ASIC). The electronic storage 228 may be volatile memory, such as RAM. In some implementations, the electronic storage 228 may include both non-volatile and volatile portions or components. Examples of electronic storage may include solid state storage, magnetic storage, and optical storage. Solid state storage may be implemented in, for example, resistor-transistor logic (RTL), complementary metal-oxide semiconductor (CMOS), or carbon nanotubes, and may be embodied in non-volatile or volatile random-access memory.

The electronic storage 228 stores instructions, perhaps as a computer program, that, when executed, cause the electronic processor 226 to interact with components in the control system 220 (such as the identification module 222 and the I/O interface 224), the electrical apparatus 230, and/or the remote station 203. For example, the instructions may cause the electronic storage 228 to store data received from the electrical apparatus 230 and settings for the operating parameters of the electrical apparatus 230. The settings that are stored for the operating parameters may be default settings that are suitable for use with any electrical apparatus, or the default settings may be specific to a type of electrical apparatus or to a particular electrical apparatus. The electronic storage 228 may store default settings for more than one type of electrical apparatus, and the default settings may be stored in association with a particular electrical apparatus.

In addition to storing settings for the operating parameters and instructions that cause the electronic processor 226 to activate the driving module 234 and the interrupting module 232, the electronic storage 228 also may store present and/or historical data pertaining to the electrical apparatus 230 and/or the environmental sensor 238. For example, the environmental sensor 238 may measure the temperature just outside of the electrical apparatus 230 and provide the measured temperature to the control system 220 via the data connection 240 or the link 242. The electronic storage 228 may store the temperature measured at regular intervals over a preset time period. The control system 220 may use such data to determine whether to adjust the operating parameters.

In some implementations, the electronic storage 228 may store present and/or historical values of the amount of current and/or voltage provided to the fault sensing module 223. The electronic storage 228 also may store information and track data related to the lifetime of the interrupting module 232 and the electrical apparatus 230. For example, the electronic storage may track the number of times that the interrupting module 232 has opened, as well as a total number of openings that the interrupting module 232 is expected to be able to perform.

Referring to FIGS. 3A-3C, block diagrams of example identification modules 322A-322C, respectively, are shown. The identification modules 322A-322C are illustrated as being part of a system 305, which is similar to the systems 105 (FIG. 1) and 205 (FIG. 2). The identification modules 322A-322C may be used in the control systems 120 (FIG. 1) and 220 (FIG. 2). The identification modules 322A-322C also may be used for retrofitting an existing control system. For illustration purposes, the identification modules 322A-322C are shown as being part of the control system 220.

Referring to FIG. 3A, the identification module 322A receives a test signal at a test port 351 and produces an output signal at an output 352. The output signal may be an electrical signal capable of being measured or sensed, and may be considered to be an electrical measurement. The test signal may be, for example, a current or a voltage produced by the electronic processor 226. The test signal completes a circuit in the identification module 322A such that a voltage or current from the electrical apparatus 230 is received at an input 353 via the data connection 240. The amount of the voltage or current received from the electrical apparatus 230 depends on the configuration and content of the driving module 234 and/or the interrupting module 232. The identification module 322A produces the output signal at output 352 based on the voltage or current received from the data connection 240. The identity of the electrical apparatus 230 may be determined from the voltage or current at the output 352.

FIG. 3B is a block diagram of an identification module 322B, which is an example implementation of the identification module 322A. The identification module 322B includes resistive elements R1-R4, an amplifier 354, and a switch 355. The resistive elements R1-R4 may be, for example, resistors or networks of resistors. In some implementations, the resistive element R1 has an impedance of 4-5 kilo Ohms (kΩ). The amplifier 354 may be, for example, an operational amplifier. The switch 355 may be a voltage-controlled switch, such as a transistor, that passes current when the voltage of the input signal exceeds a threshold. For example, the switch 355 may be a metal-oxide-semiconductor field-effect transistor (MOSFET) arranged such that the input test signal is provided to the gate (351B). The switch 355 connects the resistive element R1 to ground when the voltage of the input signal exceeds a threshold voltage associated with the MOSFET. A voltage or current from the electrical apparatus 230 may be received at input 353B. When the switch 355 connects the resistive element R1 to ground, an output signal based on a voltage or current from the electrical apparatus 230 is produced at an output 352B.

The output signal may be a voltage or a current. The value of the voltage or current at the output 352 is used to distinguish the electrical apparatus 230 as a type of electrical apparatus. For example, the identification module 322B may be used to distinguish a W type recloser from a NOVA type recloser. Both of these types of reclosers available from Eaton's Cooper Power Systems of Waukesha, Wis.

FIG. 3C is a block diagram of another example identification module 322C. The identification module 322C includes switches 355B-1, 355B-2, 355C-1, and 355C-2, and resistive elements R5-1, R5-2, R6-1, R6-2, and R7-1, R7-2. The switches 355B-1, 355B-2, 355C-1, and 355C-2 may be, for example, MOSFETs. A reference voltage $V_R$ is provided to the module 322C. When a test input voltage is provided to a test input 351C-1, the switch 355B-1 connects the resistive element R7-1 to ground, and the switch 355C-1 turns on. When a test input voltage is provided to a test input 351C-2, the switch 355B-2 connects the resistive element R7-2 to ground, and the switch 355C-2 turns on. When current flows through the switch 355C-1, a voltage is formed at 352C, and the value of the voltage at 352C depends on the reference voltage $V_R$, the impedance of the resistive element R5-1, and the impedance of the driving module 234. Because the impedance of the driving module 234 may be different in different electrical apparatuses, and the impedance of R5-1 and value of the reference voltage $V_R$ are known, the voltage at 352C may vary depending on the electrical apparatus 230 and may be used identify the electrical apparatus 230. When current flows through the switch 355C-2, a voltage is formed at 352C, and the value of the voltage at 352C depends on the reference voltage $V_R$, the impedance of the resistive element R5-2, and the impedance of the driving module 234. Because the impedance of the driving module 234 may be different in different electrical apparatuses, and the impedance of R5-2 and value of the reference voltage $V_R$ are known, the voltage at 352C may vary depending on the electrical apparatus 230 and may be used identify the electrical apparatus 230.

Current may flow through either or both of the switches 355C-1 and 355C-2 depending on the specific configuration of the module 322C and the value of the test signals provided at 351C-1 and 351C-2. In some implementations, each of the resistive elements R5-1, R5-2, R7-1, and R7-2 are 10 kΩ resistors, and the resistive elements R6-1 and R6-2 are 5 kΩ resistors. Other values may be used for any of the resistive elements, and any of the resistive elements may have a different impedance than the other resistive elements. The test input voltages received at 351C-1 and 351C-2 may have the same or different voltages. The identification module 322C may be used, for example, to distinguish between ACT-1 and ACT-2 type reclosers, both of which are available from Eaton's Cooper Power Systems of Waukesha, Wis.

The identification modules 322B and 322C are provided as examples. Other identification modules having different configurations and/or different components may be included in the control system 220 to identify the electrical apparatus 230 as being a type of recloser based on a voltage or a current from the electrical apparatus 230. Additionally, the identification modules 322B and 322C may be modified to identify additional types of reclosers.

Figure 4:
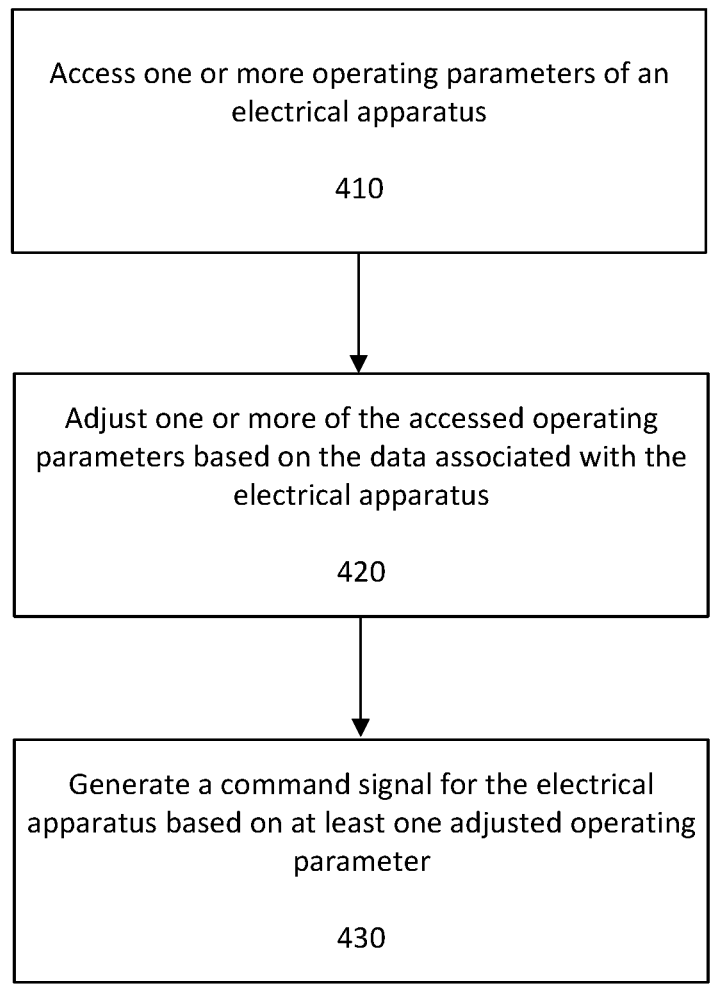
FIG. 4 is a flow chart of an example process for controlling an electrical apparatus.

Referring to FIG. 4, a flow chart of an example process 400 for controlling an electrical apparatus is shown. The process 400 may be performed on any electrical apparatus, however, the process 400 is discussed with respect to the system 205 (FIG. 2). The process 400 may be performed by the electronic processor 226.

One or more operating parameters of the electrical apparatus 230 are accessed (410). The settings of the operating parameters may be stored on the electronic storage 228, and the operating parameters may be accessed from the electronic storage 228. The operating parameters may be accessed through the I/O interface 224 by an automated process running on the processor 226 or by another component of the control system 220 (such as the identification module 222 or the fault sensing module 223). In some implementations, the settings of the operating parameters may be accessed through the I/O interface 224 from the remote station 203. The operating parameters include, for example, a reclose interval, a TCC, a duration of a trip pulse, and a duration of a close pulse.

One or more of the accessed operating parameters is adjusted (420). The accessed operating parameters are adjusted based on data associated with the electrical apparatus 230. The data may include either or both of an indication of the identity of the electrical apparatus 230 or the conditions under which the electrical apparatus 230 operates. The data that indicates the identity of the electrical apparatus 230 or the conditions may be received from the electrical apparatus through the data connection 240.

The identity of the electrical apparatus 230 may be a type of electrical apparatus, with the type being characterized by properties of the electrical apparatus and all electrical apparatuses of the type having those properties. For example, all electrical apparatuses of a certain type may use oil as an interrupting medium and a solenoid to drive the interrupting module 232. A type of electrical apparatus also may be a series or family produced by a manufacturer, where all apparatuses in the series or family have common physical characteristics. Additionally or alternatively, the identity of the electrical apparatus 230 may be the identity of a unique electrical apparatus.

The identity of the electrical apparatus 230 may be determined by the control system 220. For example, the identification module 222 (which may be implemented as the modules 322A, 322B, and/or 322C of FIGS. 3A-3C), may be used to produce an output voltage or current that is indicative of the type or unique identity of the electrical apparatus 230. The output voltage or current may be compared to a threshold to determine a type of the electrical apparatus 230. Different identification modules may be used to distinguish between certain types of electrical apparatuses. In some implementations, multiple identification modules may be included in the control system 220 and used to identify a greater number of types of electrical apparatuses. An example of a process for identifying an electrical apparatus using two identification modules is discussed with respect to FIGS. 5A and 5B.

The electrical apparatus 230 may be identified through direct operator input instead of the identification module 222. In these implementations, the user may enter the identity of the electrical apparatus directly into the control system 220 through the I/O interface 224, and the electrical apparatus 230 is identified based on this user-provided data. Moreover, the electrical apparatus 230 also may be identified based on data received through the I/O interface 224 that is not the result of a direct operator input. For example, the electrical apparatus 230 may be identified based on identification data received from the remote station 203. Further, the electrical apparatus 230 may be identified based on information stored on the electronic storage 228 at the time of manufacture or prior to distribution to the operator or end-user.

Specific settings of the accessed operating parameters also may be entered into the control system 220 through the I/O interface 224. For example, an operator of the system 205 may enter proposed settings through a human-machine interface at the control system 220, or the settings may be downloaded from the remote station 203 and stored on the electronic storage 228. The electronic storage 228 also may store default settings for all or some of the operating parameters. The default settings are settings for the operating parameters that are known to cause the electrical apparatus 230 to perform optimally. The default settings stored on the electronic storage 228 may be associated with a particular type of electrical apparatus. The proposed settings entered through the I/O interface 224 may be compared to the default settings to determine whether the proposed settings are acceptable. The proposed settings may be acceptable when they are within a predefined amount of the default settings. In some implementations, the proposed settings are acceptable when they are the same as the default settings. Proposed settings that are determined to be unacceptable, due to, for example, recloser type, temperature, estimated remaining lifetime, and/or the presence of a battery, are replaced with the default setting for that particular operating parameter.

The data associated with the electrical apparatus 230 may be data that indicates a condition under which the electrical apparatus 230 operates. For example, the environmental sensor 238 may provide data that indicates the temperature outside of the electrical apparatus 230 to the control system 220, and the temperature data may be used to adjust the operating parameters. For example, the driving module 234 includes devices that drive the interrupting module 232 in response to a control signal received from the control system 220 via the data connection 240. In cold weather, the driving module 234 may operate more slowly than in warm weather. As a result, the total amount of time from when the control system 220 initiates a control signal for a particular operation through verification that the operation has been completed may be greater in cold weather than in warm weather. For example, the control system 220 may issue a trip command to the electrical apparatus 230 to open the contacts of the interrupting module 232 in response to detecting a fault. In cold weather, the components of the driving module 234 may respond to the trip signal more slowly than they do in warmer weather. Additionally, the sensors that monitor the interrupting module 232, such as position sensors that monitor the location of contacts in the interrupting module 232, also may operate more slowly and may take longer to provide measurements to the control system 220. As a result, the trip command may successfully open the contacts of the interrupting module 232 but an indication that the operation was successful is not provided to the control system 220 within an expected amount of time. Such a delay may lead to the control system 220 incorrectly determine that the electrical apparatus 230 is in an error state.

To reduce or eliminate the occurrence of timing errors due to temperature conditions, the electronic storage 228 may store a temperature threshold below which the electrical apparatus 230 and/or the components of the electrical apparatus 230 are known to respond more slowly than typical. When the data from the environmental sensor 238 indicates that the temperature at the electrical apparatus 230 is below the threshold, the reclose interval and the TCC may be increased. Such an adjustment may ensure that the electrical apparatus 230 performs optimally even in extreme weather situations.

Additionally, the effect of temperature variations may depend on the type of electrical apparatus. For example, apparatuses that use an oil interrupting medium may be more adversely impacted by temperature changes than apparatuses that use a vacuum interrupter. Thus, the temperature data from the sensor 238 may be used with the identity of the electrical apparatus 230 to adjust the operating parameters. For example the electronic storage 228 may store multiple thresholds below which the reclose interval and the TCC are to be increased, and the multiple thresholds may each be associated with a particular type of electrical apparatus.

The data that indicates the conditions under which the electrical apparatus 230 operates also may include data related to the expected remaining lifetime of the electrical apparatus 230 and/or the status of the energy storage device 225.

The performance of the electrical apparatus 230 may begin to change as the remaining lifetime of the apparatus 230 decreases. For example, the components of the driving module 234 that drive the interrupting module 232 may operate more slowly due to corrosion or wear. The driving module 234 may become less responsive to the trip and close signals that the control system 220 issues to open and close, respectively, the contacts of the interrupting module 232. The operating parameters may be adjusted to account for these changes. For example, the duration of the trip and close signals may be increased.

The control system 220 may determine the expected remaining lifetime for the electrical apparatus 230 based on operating conditions or the identity of the electrical apparatus. The expected remaining lifetime may depend on the amount of current that the interrupting module 232 has handled and the number of times that the interrupting module 232 has opened and closed the transmission path 106. The electronic storage 228 stores current and voltage measurements from the electrical apparatus 130 and the fault sensing module 223, and this information may be used to estimate the remaining lifetime of the electrical apparatus 230. Additionally, the expected remaining lifetime may be effected by environmental conditions, and information from the environmental sensor 238 also may be used to estimate the remaining lifetime of the electrical apparatus 230. The total lifetime also may be known for a particular type of electrical apparatus 230. In some implementations, the electronic storage 228 includes total expected lifetime for multiple electrical apparatuses, and, the relevant total lifetime is selected based on an identification of the electrical apparatus 230 made by the control system 220. In these implementations, the remaining lifetime may be estimated from the total lifetime, taking into account the amount of current that the interrupting module 224 has handled and/or the amount of times the interrupting module 224 has opened and closed the transmission path 106.

The status of the energy storage device 225 also may be used to adjust the operating parameters. The status of the energy storage device 225 may be the remaining amount of time that the device 225 is expected to provide power, or the status may indicate whether or not the energy storage device 225 is present in the control system 220 and capable of providing energy. The energy storage device 225 may be used to power the control system 220 and operate the interrupting module 232 when the transmission path 106 is open and the control system 220 is not receiving AC power. If the status of the energy storage device 225 indicates that the device 225 has below a threshold amount of energy remaining, the operating parameters may be adjusted to prolong the life of the energy storage device 225. For example, the reclose interval and the TCC may be adjusted such that the control system 220 attempts fewer opening and reclosing operations while trying to clear a particular fault. The number of trip and close operations that occur prior to the electrical apparatus 230 remaining open until the fault is cleared by a lineman is the "trips to lock out." The number trips to lock out is a parameter of the electrical apparatus 230 that may be adjusted. In another example, the reclose interval may be adjusted to be longer to provide additional time to charge capacitors or other energy storage devices in the electrical apparatus 230. Further, the TCC may be adjusted to be shorter, which may shorten the amount of time the electrical apparatus 230 is without AC power.

The operating parameters may be adjusted based on the conditions with or without consideration of the identity of the electrical apparatus 230. For example, the electronic storage 228 may store instructions that cause the electronic processor 226 to lengthen the reclose interval and the TCC when the temperature drops more than a certain amount within a pre-defined time period. In another example, the operating parameters may be adjusted based on the actual performance of the electrical apparatus 230, such as the actual amount of time needed for the driving module 234 and the interrupting module 232 to open or close the transmission path 106. The control system 120 may adjust the reclose interval and/or the TCC to account for this time. Additionally, the electronic storage 228 may store the time required for the driving module 234 and the interrupting module 232 to open the transmission path 106 over a period of weeks or months. If the average time to open the transmission path 106 is increasing, the reclose interval may also be increased to account for the additional time that the interrupting module 232 requires to open the transmission path 106.

If one or more operating parameters are adjusted, the control system 220 may present a perceivable indication of the adjustment through the I/O interface 224. The perceivable indication may be used to notify the end-user or operator of a change in the operating parameters. For example, a visual notice may be presented at a display, or an audible sound may be emitted from the I/O interface 224. The I/O interface 224 may initiate a sequence of events that presents the perceivable indication at a location that is remote from the control system 220. For example, the perceivable indication may be presented at the remote station 203 or sent to an end-user, operator, or manufacturer of the electrical apparatus 230 by electronic mail or text message.

A control signal based on at least one adjusted operating parameter is generated for the electrical apparatus 230 (430). The control signal is generated by the processor 226 and provided to the electrical apparatus 230 via the data connection 240. In response to receiving the control signal, the driving module 234 causes the interrupting module 232 of the electrical apparatus 230 to open or close the transmission path 106. The interrupting module 232 may open the transmission path 106 by separating or disconnecting contacts, and the transmission path 106 may be closed by connecting the contacts. The control signal is based on the adjusted operating parameter such that the control signal causes the interrupting module 232 to act in a manner that is consistent with the operating parameters. For example, if the adjusted operating parameter is the reclose interval (the time during a fault condition during which the interrupting module 232 is closed), the control signal causes the driving module 234 to close the contacts of the interrupting module 232 and the contacts remain closed for the adjusted reclose interval.

Figure 5A:
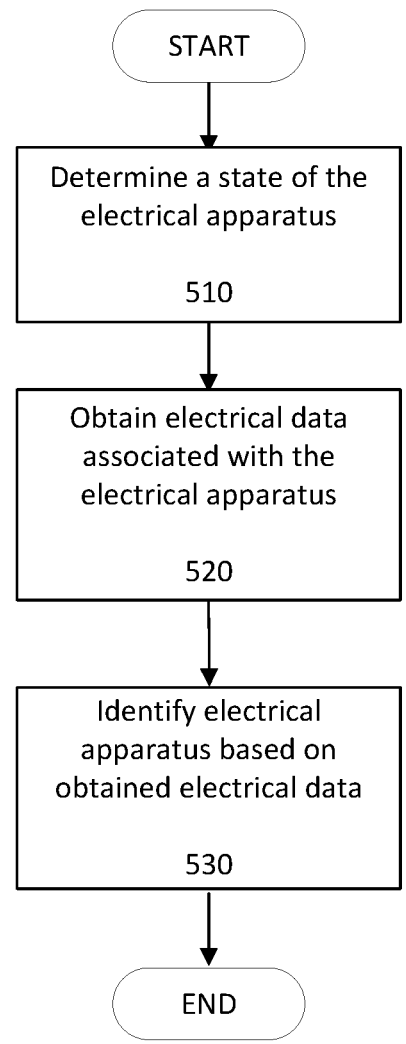
FIGS. 5A and 5B are flow charts of an example process for identifying an electrical apparatus by determining the type of the electrical apparatus.

Referring to FIG. 5A, a flow chart of an example process 500 for identifying an electrical apparatus is shown. The process 500 identifies the electrical apparatus by determining the type of the electrical apparatus. The process 500 may be performed by the electronic processor 226 of the control system 220. The process 500 is discussed with respect to the system 205 (FIG. 2), but the process 500 may be performed on other systems that include a control system and an electrical apparatus.

A state of the electrical apparatus 230 is determined (510). For example, the state of the electrical apparatus 230 may be "open" or "closed." The electrical apparatus 230 is open when the interrupting module 232 prevents current from flowing (for example, when the contacts are separated), and the electrical apparatus 230 is closed when the interrupting module 232 allows current to flow through the electrical apparatus 230.

Figure 5B:
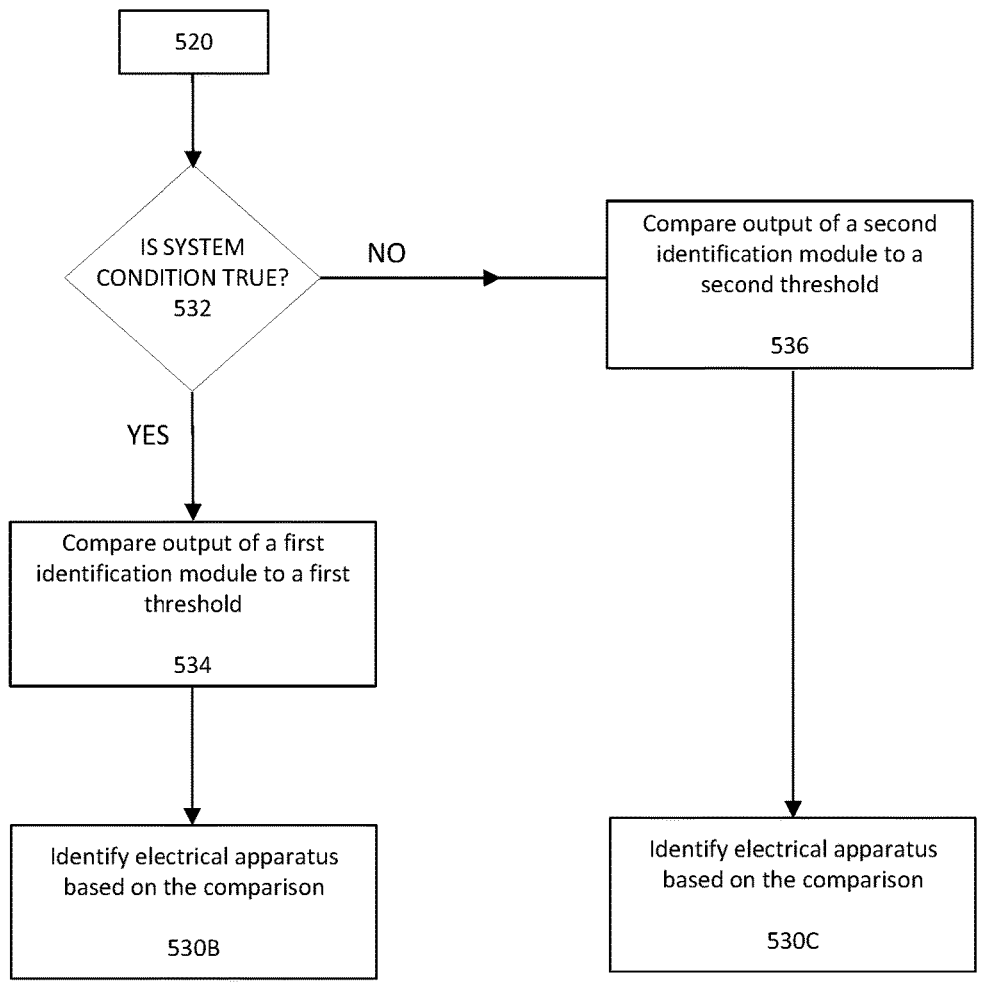

Electrical data associated with the electrical apparatus 230 is received (520). The electrical data may be, for example, a voltage or current measurement from the electrical apparatus 230. The electrical apparatus 230 is identified based on the received electrical data (530). The electrical apparatus 230 may be identified as a unique electrical apparatus or as a type of electrical apparatus. Referring also to FIG. 5B, a flow chart of an example of (530) is shown. The example shown in FIG. 5B may be used to identify the electrical apparatus 230 as one of four types of electrical apparatuses.

One or more system conditions of the electrical apparatus 230 is assessed (532). The system condition may be a condition or setting of the system 205 that is known to be true only for some types of electrical apparatuses. For example, the control system 220 may determine the value or setting of an input that specifies that a coil is present in the electrical apparatus 230. In the example of FIG. 5B, the assessed condition is shown as having two possible outcomes (true or false). However, in other examples, the assessed condition may have more than two values or states.

If the system condition is determined to be true, a first identification module is activated. For example, the first identification module may be the identification module 322B (FIG. 3B), and the module may be activated by providing a test voltage to the test input 351B that causes the switch 355 to connect the resistive element R1 to ground. Activating the identification module 322B produces an electrical measurement, an output voltage at the output 352B. The voltage at the output 352B is compared to a first threshold (534). The type of electrical apparatus is determined based on the comparison of the voltage at the output 352B to the first threshold (530B). For example, if the voltage is greater than the first threshold, the electrical apparatus 230 is determined to be a first type of electrical apparatus. If the voltage is less than or equal to the first threshold, the electrical apparatus is determined to be a second type of electrical apparatus that is different from the first type.

If the system condition is determined to be false, a second identification module (such as the identification module 322C of FIG. 3C) is activated. An electrical measurement, such as the voltage produced at 352C is compared to a second threshold (536). The second threshold may be a different value than the first threshold. The type of electrical apparatus is determined based on the comparison to the second threshold (530C). For example, if the voltage is greater than the second threshold, the electrical apparatus 230 is determined to be a third type of electrical apparatus. If the voltage is less than or equal to the first threshold, the electrical apparatus is determined to be a fourth type of electrical apparatus that is different from the third type. The first and second thresholds may be different values. The first and second types of electrical apparatuses are different from the third and fourth types.

In some implementations, the process 500 may be performed with the electrical apparatus 230 in an open state or a closed state, and the values of the first and second thresholds may be different depending on the state of the electrical apparatus 230. The process 500 may be performed with the electrical apparatus 230 in the open state and the closed state in some implementations.

Additionally, other parameters of the system 205 may be used to further distinguish among types of electrical apparatuses. For example, a single-phase recloser may have different system settings than a three-phase recloser, and those system settings may be used to determine that the electrical apparatus is a single-phase recloser. Furthermore, the process 500 may be expanded such that more than four types of electrical apparatuses may be identified. For example, more than two different types of identification modules may be used.

Other features are within the scope of the claims.

What is claimed is:

1. A system comprising:
an electrical apparatus configured to control the flow of electricity in a power distribution network, the electrical apparatus comprising: a communications interface and electrical contacts, the electrical contacts configured to connect to each other to allow electricity to flow through the electrical apparatus and to disconnect from each other to prevent electricity from flowing through the electrical apparatus; and
a control system for the electrical apparatus, the control system comprising:
a data connection configured to connect to the communications interface of the electrical apparatus and to receive electrical data from the electrical apparatus;
an identification module configured to produce an electrical measurement based on electrical data received from the electrical apparatus through the data connection; and
an electronic storage and one or more electronic processors coupled to the electronic storage, the electronic storage comprising instructions that, when executed, cause the one or more electronic processors to:
identify the electrical apparatus based on the electrical measurement, and
adjust one or more operating parameters of the electrical apparatus based on the identity of the electrical apparatus.

2. The system of claim 1, wherein
the electrical apparatus comprises one or more electrical or mechanical components, the one or more electrical or mechanical components being associated with an electrical characteristic and at least some of the electrical data from the electrical apparatus depends on the electrical characteristic, and
the identification module is configured to produce an electrical measurement that depends on the electrical characteristic.

3. The system of claim 2, wherein the identification module comprises a network of electrical components configured to produce one or more of a voltage and a current based on the electrical data from the electrical apparatus, and the electrical apparatus is identified based on one or more of the produced voltage and the produced current.

4. The system of claim 1, wherein identifying the electrical apparatus comprises identifying the electrical apparatus as a type of electrical apparatus or as a particular apparatus.

5. The system of claim 1, wherein the one or more operating parameters of the electrical apparatus that are adjusted based on the identity of the electrical apparatus comprise one or more of:
a reclose interval, the reclose interval being a time during which the contacts of the electrical apparatus are disconnected during a fault condition in the power distribution network,
a time current curve (TCC), the TCC being a time duration during which the contacts of the electrical apparatus are connected during a fault condition,
a temporal duration of a trip pulse, the contacts of the electrical apparatus being configured to disconnect from each other in response to the trip pulse, and
a temporal duration of a close pulse duration, the contacts of the electrical apparatus being configured to connect to each other in response to the close pulse.

6. The system of claim 1, wherein the electrical data received from the electrical apparatus comprises information indicating one or more of a time for the contacts of the electrical apparatus to open and a time for the contacts to close, and one or more of the operating parameters are adjusted based on the information indicating the time for the contacts to open or the time for the contacts to close.

7. The system of claim 1, further comprising a temperature sensor positioned to measure a temperature at the electrical apparatus, the temperature sensor being configured to provide the measured temperature to the control system, and wherein the one or more operating parameters of the electrical apparatus are adjusted based on the identity of the electrical apparatus and the measured temperature at the electrical apparatus.

8. The system of claim 1, wherein:
the instructions to adjust one or more operating parameters of the electrical apparatus comprise instructions to cause one or more of the operating parameters to be updated to a respective default setting,
adjusting one or more of the operating parameters of the electrical apparatus comprises adjusting at least one of the operating parameters based on an accessed template associated with the electrical apparatus, and
the electronic storage of the control system further comprises instructions that, when executed, cause the one or more processors to:
access the template associated with the electrical apparatus, the template comprising settings for one or more of the operating parameters of the electrical apparatus;
compare the settings for the one or more of the operating parameters in the template to the default setting for the respective parameter;
determine whether the settings of the operating parameters in the template are acceptable based on the comparison; and
replace any operating parameters in the template that are not acceptable with the default setting for that parameter.

9. The system of claim 8, wherein the template associated with the electrical apparatus is configured to be edited by an operator.

10. The system of claim 1, further comprising a backup source of electrical power, and wherein the one or more operating parameters of the electrical apparatus are adjusted based on the identity of the electrical apparatus and the presence of the backup source of electrical power.

11. The system of claim 1, wherein the electronic storage of the control system further comprises instructions that, when executed, cause the one or more processors to estimate an operating lifetime of the electrical apparatus, and wherein the one or more operating parameters of the electrical apparatus are adjusted based on the identity of the electrical apparatus and the estimated operating lifetime of the electrical apparatus.

12. The system of claim 1, wherein electrical apparatus comprises a recloser or a switchgear.

13. The system of claim 1, wherein the electronic storage of the control system further comprises instructions that, when executed, cause the one or more processors to present a perceivable indication that one or more operating parameters have been adjusted.

14. A method of controlling an electrical apparatus of an electrical power distribution network, the method comprising:
    accessing, at a control system, one or more operating parameters, the operating parameters being associated with the operation and control of the electrical apparatus;
    adjusting one or more of the accessed operating parameters, the adjustment being based on data associated with the electrical apparatus;
    generating a control signal for the electrical apparatus based on at least one adjusted parameter, the control signal being sufficient to control the electrical apparatus in accordance with the adjusted operating parameter, wherein controlling the electrical apparatus comprises causing contacts of the electrical apparatus to disconnect from each other to prevent electrical current from flowing through the electrical apparatus and causing the contacts of the electrical apparatus to connect to each other to allow current to flow through the electrical apparatus;
    activating an identification module at the control system; and
    identifying, at the control system, the electrical apparatus based on the data associated with the electrical apparatus, wherein
        the data associated with the electrical apparatus is received from the electrical apparatus,
        the identification module produces an electrical measurement based on the data received from the electrical apparatus, and
        the electrical apparatus is identified based on the electrical measurement.

15. The method of claim 14, wherein the data associated with the electrical apparatus comprises an electrical signal from the electrical apparatus, and identifying the electrical apparatus comprises:
    measuring a voltage, the measured voltage being based on the electrical signal from the electrical apparatus,
    comparing the measured voltage to one or more threshold voltages, and
    identifying the electrical apparatus based on the comparison.

16. The method of claim 14, wherein the data associated with the electrical apparatus comprises data indicating a condition associated with the electrical apparatus, and one or more operating parameters are adjusted based on the condition, and the condition associated with the electrical apparatus comprises one or more of a temperature at the electrical apparatus, an expected remaining lifetime of the electrical apparatus, and a status of an energy storage device at the control system.

17. The method of claim 14, wherein the data associated with the electrical apparatus comprises data received from the electrical apparatus, and comprises information indicating one or more of a time for contacts of an interrupting module of the electrical apparatus to disconnect and a time for the contacts of the interrupting module of the electrical apparatus to reconnect.

18. The method of claim 14, wherein the data associated with the electrical apparatus comprises an electrical signal from the electrical apparatus, and identifying the electrical apparatus comprises measuring a current or a voltage based on the electrical signal from the electrical apparatus.

19. A method of controlling an electrical apparatus of an electrical power distribution network, the method comprising:
    accessing, at a control system, one or more operating parameters, the operating parameters being associated with the operation and control of the electrical apparatus;
    adjusting one or more of the accessed operating parameters, the adjustment being based on data associated with the electrical apparatus;
    generating a control signal for the electrical apparatus based on at least one adjusted parameter, the control signal being sufficient to control the electrical apparatus in accordance with the adjusted operating parameter, wherein controlling the electrical apparatus comprises causing contacts of the electrical apparatus to disconnect from each other to prevent electrical current from flowing through the electrical apparatus and causing the contacts of the electrical apparatus to connect to each other to allow current to flow through the electrical apparatus;
    identifying, at the control system, the electrical apparatus based on the data associated with the electrical apparatus, wherein the data associated with the electrical apparatus is received from an input interface at the control system and comprises user-defined settings for at least one of the accessed operating parameters;
    comparing the user-defined settings to default settings for the at least one of the accessed operating parameters;
    determining whether the user-defined settings are acceptable based on the comparison; and
    replacing the user-defined settings with the default settings if the user-defined settings are not acceptable.

20. The method of claim 19, wherein the data associated with the electrical apparatus is from a remote station that is in a different location than the control system, and the data is received at the input interface.

21. The method of claim 19, wherein the data associated with the electrical apparatus comprises an identity of the electrical apparatus.

* * * * *